Dec. 17, 1968    V. S. FIGARO    3,416,981
METHOD OF COVERING AN AUTOMOBILE DOOR TRIM BEAD
Filed April 19, 1967
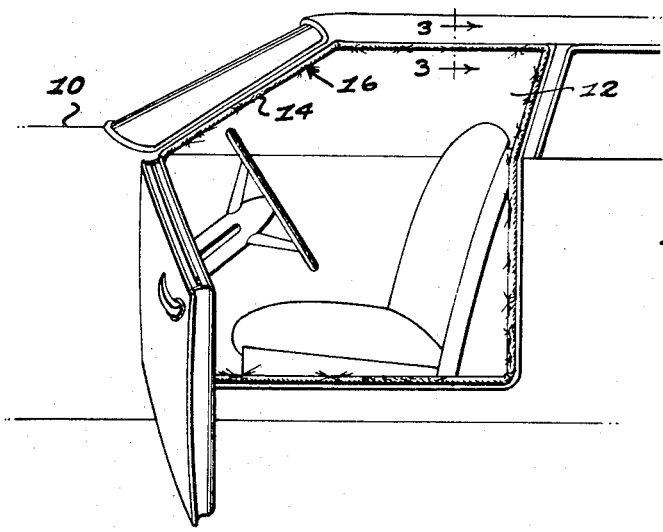
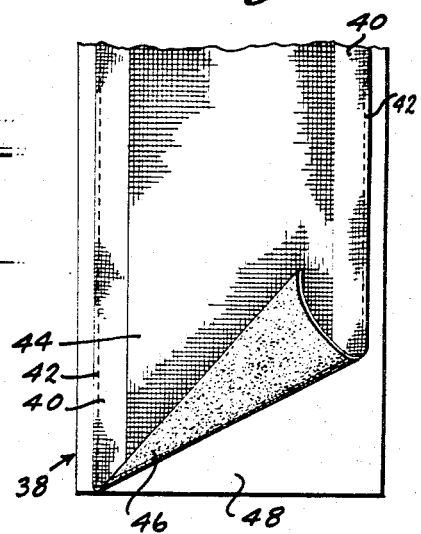
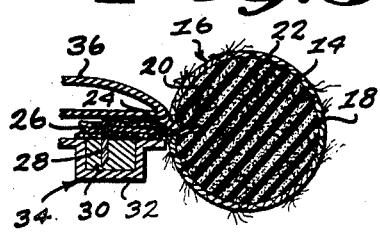
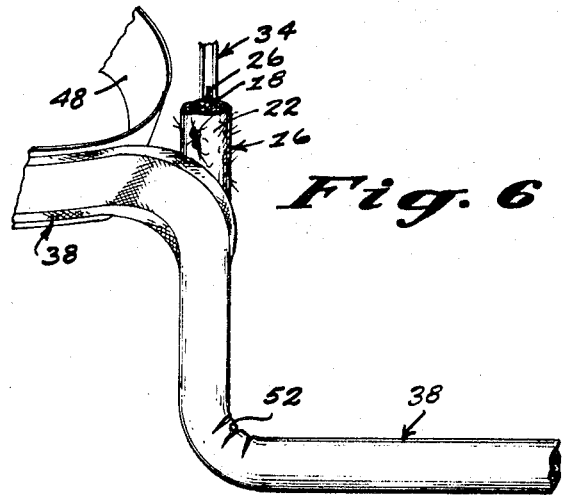
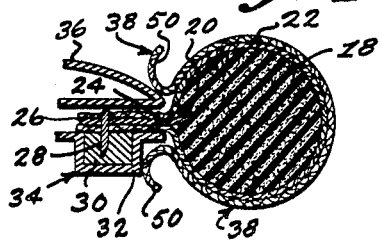
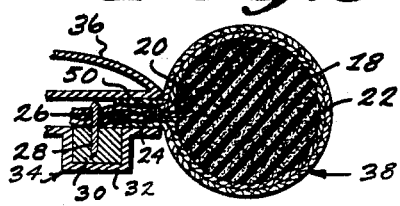
INVENTOR
VINCENT S. FIGARO
BY
Channing L. Richards &
Dalbert U. Shefte
ATTORNEYS United States Patent Office 3,416,981
Patented Dec. 17, 1968

3,416,981
METHOD OF COVERING AN AUTOMOBILE DOOR TRIM BEAD
Vincent S. Figaro, Davidson, N.C., assignor to Bridgeport Fabrics, Incorporated, Davidson, N.C., a corporation of Connecticut
Filed Apr. 19, 1967, Ser. No. 631,936
2 Claims. (Cl. 156—94)

ABSTRACT OF THE DISCLOSURE

A door trim bead installed in the body frame around a door opening in an automobile and having a generally cylindrical exposed portion covered after such installation by providing a strip of covering material that has a width which exceeds that required to wrap the exposed portion of the door trim bead and that has a pressure-sensitive adhesive backing, by wrapping the central portion of the strip of covering material about the exposed portion of the door trim bead and fixing the same thereto, and by tucking the free edges of the strip of covering material within the body frame of the automobile.

Background of the invention

The doors in automobiles manufactured by assembly line production methods do not fit precisely in the door openings formed in the body frame of such automobiles, and these door openings are therefore provided with door trim beads extending therearound to form a door seal which prevents uncomfortable quantities of outside air and moisture from leaking into the automobile when the door of the automobile is closed.

Door trim beads of this type are manufactured separately and supplied to the automobile manufacturer for installation during assembly of the automobile, and they include a shank portion which is permanently anchored within the body frame of the automobile and out of view, and an exposed portion which extends around the door opening in the body frame for contacting the edges of the door when it is closed to form the aforementioned door seal. This exposed portion, because it is in plain view, is covered with a fabric material of so-called windlace properly selected to complement the interior decor of the automobile and to provide a pleasing appearance.

The doorway location of the exposed portion of the door trim bead subjects it to considerable wear often resulting in the windlace becoming tattered and soiled during the service life of the automobile, and the detracting appearance of this worn windlace has heretofore been endured because the integral construction of the body frame at the door opening of an automobile does not admit to ready replacement of the original door trim bead anchored therein, and because, heretofore, there has been no practical method of covering this worn windlace.

Summary of the invention

According to the present invention, a worn or soiled door trim bead can be restored quickly and easily at low cost and without using any special tools, and the restored door trim bead has the appearance of new, original equipment. This restoration is accomplished by providing the door trim bead with a new covering that is held securely in place in a manner which prevents it from becoming loose or separated from the door trim bead under service conditions.

Briefly described, the present invention provides for covering an installed trim bead by providing a strip of covering material having a width which exceeds that required to wrap the exposed portion of the door trim bead and having a pressure sensitive adhesive backing thereon, then wrapping the central portion of the strip about the exposed portion of the door trim bead and fixing the same thereto, and finally tucking the free side edges of the strip into the body frame of the automobile.

Brief description of the drawings

FIG. 1 is a partial right side view of an automobile having an installed door trim bead which has become worn;

FIG. 2 is a plan view of an end portion of a strip of covering material to be applied to the worn door trim bead illustrated in FIG. 1;

FIG. 3 is an enlarged detail sectional view of the worn door trim bead taken substantially at line 3—3 in FIG. 1;

FIG. 4 is a detail sectional view corresponding to FIG. 3 and illustrating an intermediate step in covering the worn door trim bead with the strip of covering material;

FIG. 5 is a further detail sectional view illustrating the strip of covering material finally installed about the worn door trim bead; and FIG. 6 is a partial side view of the door trim bead at a corner of the door opening in the body frame of the automobile illustrating the strip of covering material as it is being applied to the door trim bead in accordance with the present invention.

Description of the preferred embodiment

Referring now in greater detail to the accompanying drawings, FIG. 1 illustrates a passenger automobile 10 having a door opening 12 around which extends the generally cylindrical exposed portion 14 of an installed conventional door trim bead 16. As best seen in FIG. 3, the door trim bead 16 comprises a cylindrical core element 18 formed of rubber or the like and having an attachment strip 20 of relatively stiff material such as wire reinforced cardboard fixed edgewise therein, the core element 18 and the attachment strip 20 being covered by windlace 22 held tightly in place by stitching 24 passing therethrough and through attachment strip 20. Also, in some instances, the windlace 22 may be secured to the core element 18 by an adhesive applied to the windlace 22 in liquid form during manufacture of the door trim bead 16 as disclosed, for example, in U.S. Patent No. 1,970,633.

As thus formed, the door trim bead 16 is supplied to the automobile manufacturer for installation in the automobile during assembly thereof. This installation may be accomplished in a variety of well-known ways, one of which is partially illustrated by FIG. 3. The attachment strip 20, which may be covered by the edges of windlace 22, forms a shank portion 26 through which staples 28 or the like are passed to anchor the door trim bead 16 to a tacking strip 30, usually composed of a mixture of tar and paper, that is retained by metal tabs (not shown) in a channel 32 forming part of the body frame 34 of the automobile. The headliner support 36 illustrated in FIG. 3 forms part of the body frame 34 and is fixed into place after staples 28 have been installed so that the shank portion 26 of the door trim bead 16 is permanently anchored within the confines of body frame 34 around door opening 12 and the exposed portion 14 of the door trim bead 16 will be disposed thereat.

To restore the appearance of the installed door trim bead 16 when windlace 22 becomes worn or soiled, the present invention provides a strip of covering material 38 comprising a base 40 of suitable fabric material such as cotton stitched along its side edges as at 42 to prevent unraveling of the fabric, and a superimposed layer 44 of long wearing and flexible material such as vinyl yarn extending across a major portion of the width of base 40. The base 40 is formed with a backing 46 of a suitable pressure sensitive adhesive which is protectively shielded by an extraneous sheet 48 of silicone treated paper that is easily removable to expose the pressure-sensitive adhesive backing 46 preparatory to using the strip of covering material 38. It should be noted here that the strip of covering material 38 has a width which exceeds that required to wrap the exposed portion 14 of the door trim bead 16 to be covered, this excess width serving a purpose which will be explained presently.

The strip of covering material 38, which may be suitably packaged in ten-foot lengths to supply enough material for covering the door trim bead of one automobile door, is applied to the door trim bead 16 as illustrated in FIGS. 4, 5 and 6. First, beginning at one end of the strip of covering material 38, the shielding sheet 48 is peeled back to expose the adhesive backing 48 only along a strip length which can be handled conveniently in applying the strip to the door trim bead 16, this strip length generally being about 6 or 8 inches. The central portion of this length of the strip 38 is then wrapped about the exposed portion 14 of the door trim bead 16 and fixed thereto by pressing the adhesive backing 46 thereagainst as illustrated in FIG. 4. Since the width of the strip 38 exceeds that required to wrap the exposed portion 14 as previously described, the side edge portions 50 of the strip 38 are left free (FIG. 4), and these side edge portions 50 are then tucked into the body frame 34 using any convenient tool having a thin blade-like surface suitable for this purpose. By tucking the side edge portions 50 into the body frame 34 in this manner, the exposed portion 14 of the door trim bead is completely wrapped (FIG. 5) so as to have the same appearance as a new door trim bead, and the side edge portions 50 are held in place adjacent the bead shank portion 26 by the body frame 34 so that they will not be pulled loose by continuous brushing contact with the clothing of occupants entering and leaving the automobile.

After substantially all of the strip portion having the exposed adhesive backing 46 has been thus installed, the shielding sheet 48 is progressively removed to expose the adhesive backing 46 at successive strip portions of convenient handling length, and these strip portions are likewise installed at successive lengthwise portions of the door trim bead 16 until the full length thereof is covered.

In instances where the installed strip of covering material 38 gathers up because of substantial changes in the direction of its lengthwise extent, the appearance of the covered door trim bead may be improved if the gathered portion is removed by cutting out wedge shaped sections of the strip 38 as illustrated by reference numeral 52 in FIG. 6.

This invention has been described above in detail for purposes of illustration only and is not intended to be limited by this description or otherwise except as defined in the appended claims.

I claim:
1. The method of covering a generally cylindrical exposed portion of an automobile door trim bead having a coextensive shank portion thereof anchored within the body frame around a door opening in an automobile, said method comprising the steps of providing a strip of covering material having a width which exceeds that required to wrap said exposed portion of the door trim bead and having a pressure-sensitive adhesive backing thereon, wrapping the central portion of said strip about said exposed portion of the door trim bead and fixing the same thereto by pressing said adhesive backing thereagainst, and then tucking the free side edge portions of said strip into said body frame with said bead shank portion.

2. The method of covering a generally cylindrical exposed portion of an automobile door trim bead as defined in claim 1 and further characterized in that the adhesive backing on the provided strip of covering material has an extraneous protective shielding initially applied thereto, and in that said extraneous protective shielding is progressively removed to expose said adhesive backing at successive covering strip portions of convenient handling length for wrapping, fixing and tucking at successive lengthwise portions of said door trim bead until the full length thereof is covered.

References Cited

UNITED STATES PATENTS

| | | | |
|---|---|---|---|
| 1,836,094 | 12/1931 | Toncray | 49—482 |
| 2,550,151 | 4/1951 | Iknayan et al. | |
| 2,655,698 | 10/1953 | Chalik et al. | 49—500 X |
| 2,898,648 | 8/1959 | Bright | 49—500 X |
| 2,955,642 | 10/1960 | Stark | 156—94 X |
| 3,032,840 | 5/1962 | Husvar et al. | 49—500 X |
| 3,041,682 | 7/1962 | Alderfer et al. | 49—475 |

DAVID J. WILLIAMOWSKY, *Primary Examiner.*

PHILIP C. KANNAN, *Assistant Examiner.*

U.S. Cl. X.R.

49—500; 277—230